(12) United States Patent
Ogunbo

(10) Patent No.: US 10,804,774 B1
(45) Date of Patent: Oct. 13, 2020

(54) METHOD OF OBTAINING POWER FROM BRUSHED DC MOTORS

(71) Applicant: Samuel Ogunbo, Rosedale, MD (US)

(72) Inventor: Samuel Ogunbo, Rosedale, MD (US)

(73) Assignee: Samuel Ogunbo, Rosedale, MD (US)

( * ) Notice: Subject to any disclaimer, the term of this patent is extended or adjusted under 35 U.S.C. 154(b) by 46 days.

(21) Appl. No.: 16/232,997

(22) Filed: Dec. 26, 2018

(51) Int. Cl.
  *H02K 13/14* (2006.01)
  *H02K 7/02* (2006.01)
  *H02K 11/00* (2016.01)
  *H02K 15/14* (2006.01)
  *H02K 5/14* (2006.01)

(52) U.S. Cl.
  CPC .............. *H02K 13/14* (2013.01); *H02K 5/148* (2013.01); *H02K 7/02* (2013.01); *H02K 11/0094* (2013.01); *H02K 15/14* (2013.01)

(58) Field of Classification Search
  CPC .......... H02K 13/14; H02K 5/148; H02K 7/02; H02K 11/0094; H02K 15/14
  USPC ........................................................ 310/68 R
  See application file for complete search history.

(56) References Cited

U.S. PATENT DOCUMENTS

| 7,411,324 | B2* | 8/2008 | Kusumi | H02K 11/048 310/68 D |
| 2013/0162115 | A1* | 6/2013 | Kim | H02K 15/12 310/68 R |
| 2015/0381080 | A1* | 12/2015 | Virella | H02K 53/00 310/52 |
| 2016/0049839 | A1* | 2/2016 | Paiva | G21H 7/00 310/68 R |

* cited by examiner

*Primary Examiner* — Albert K Wong

(57) ABSTRACT

This disclosure describes a DC motor system that is capable of extracting electrical power to do useful work while the DC motor is in operation. The present invention relates to a DC motor configured to have a plurality of brushes which enables two of the plurality of brushes to serve as input power brushes and at least one of the plurality of brushes to serve as power extraction brush to extract electrical power from the DC motor. The extraction of electrical power is achieved by using a power extraction circuit which switches the extracted power between two different energy storage devices. The energy storage device includes and not limited to capacitors and batteries.

10 Claims, 8 Drawing Sheets

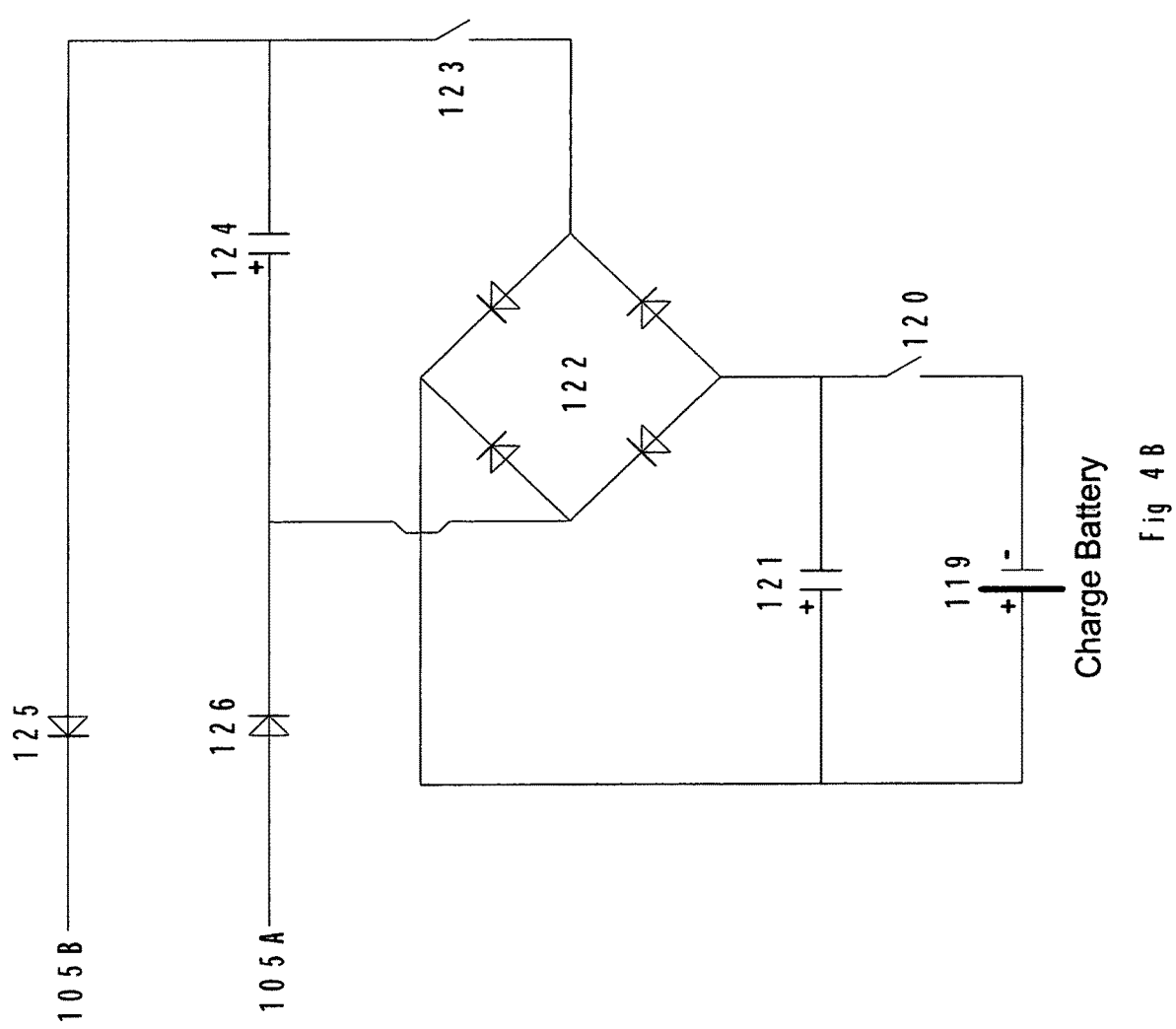

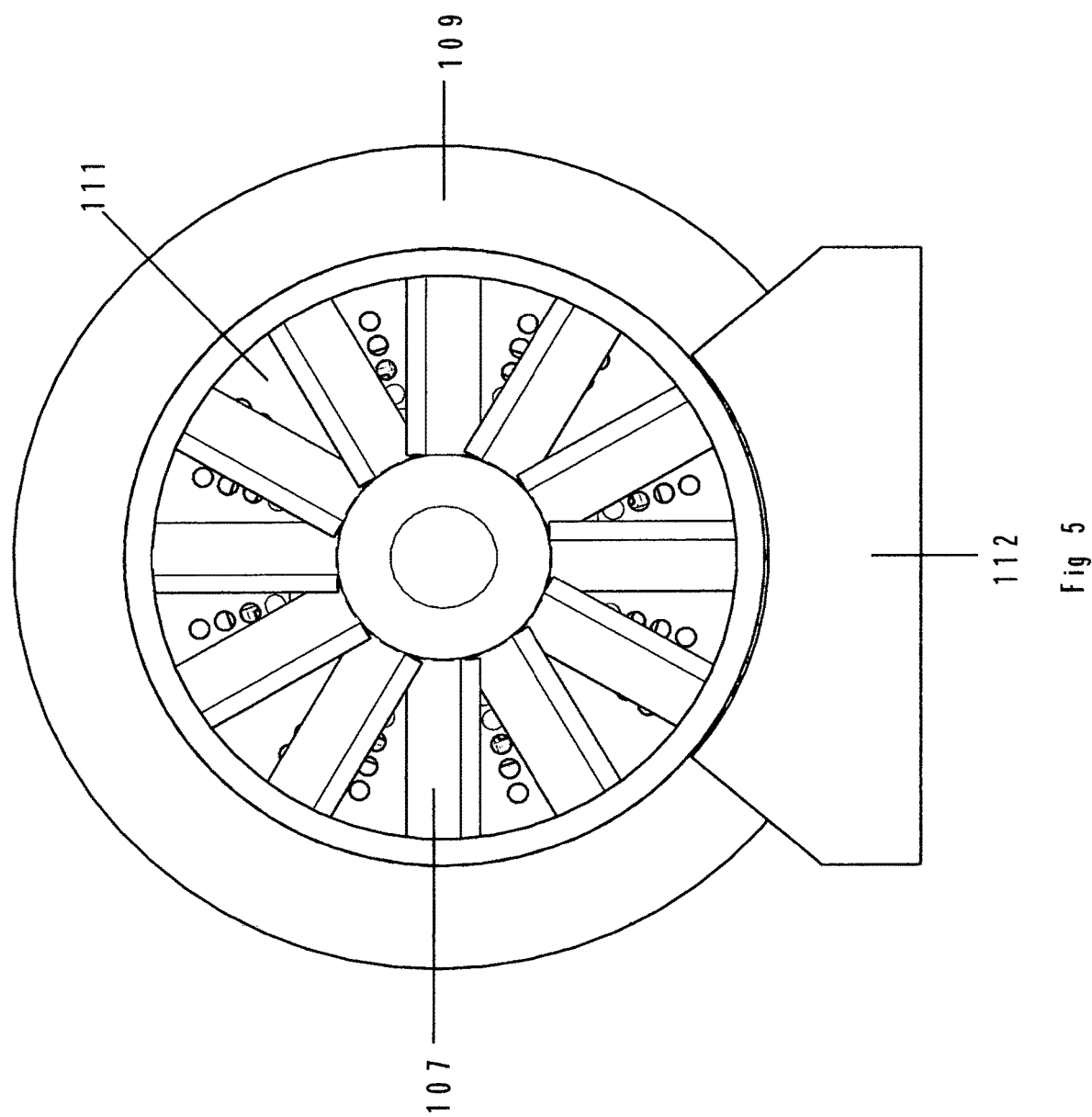

10,804,774 B1

METHOD OF OBTAINING POWER FROM BRUSHED DC MOTORS

BACKGROUND OF THE INVENTION

Field of the Invention

The present invention is in the field of energy harvesting and pertains particularly to methods for extracting power from a brushed DC motor that is in operation.

Discussion of the State of the Art

In recent years, electrical motors are used to convert electrical power to mechanical energy. The working principles of a conventional electric motor have remained virtually unchanged since their development in the early 1800's. While the scale and features of electric motors are customizable depending on the application, the operating principles remain largely the same. Electric motors are used in a variety of applications, due to their versatility and ease of use. Furthermore, brushed DC motors are inexpensive to manufacture, and their versatility allows users to integrate them into various applications. The similarities in design between electric DC motors and generators are evident. While an electric motor changes electrical energy into mechanical energy, a generator uses mechanical energy to generate electricity.

Brushed DC motors generally comprise the following components: two-brush, two-magnetic pole magnets or a plurality of magnets, a plurality of rotor coils, a set of commutator segments, a rotor, a shaft, fan for cooling and housing. Furthermore, some brushed DC motors will rely on a flywheel for operation. As for the magnets, they have two polarities, namely the North and South Pole. The poles are always 180 degrees facing from each other. When there are at least two magnets in a motor, the North Pole and the South pole will be strongly attracted to each other. The rotor armature coils are arranged in the form of windings and embedded in layers of laminated iron cores (known as armature) that then form an electromagnet that's wired up to a commutator. A carbon brush is a sliding contact on the commutator and used to transmit electrical current from a static part of the motor. Using carbon brushes to operate an electric DC motor is one of the oldest and simplest methods of using direct current to perform work.

When current is applied from the terminals of a battery through a brush connected to the commutator, the current produces a magnetic field surrounding the conductor in the armature windings. Due to the rotation of this armature winding in the magnetic field, the flux linked with it changes at different positions. As such, an electromotive force (EMF) or back electromotive force (BEMF) is created in the armature winding. This BEMF, acts against the applied voltage that's causing the motor to spin, and reduces the current flowing through the coils of the motor.

In order to make motors efficient, there is need to reduce the level of BEMF that is generated or find a way to extract this power for a potential use in charging batteries or powering commensurate loads. Therefore it is a principal objective of this invention to provide methods to extract power from a DC motor that is in operation. This objective is achieved by adding power extracting brushes circumferentially around the commutator to extract BEMF power and then save this power in energy storage devices such as a set of capacitors and or batteries to do useful work.

SUMMARY OF THE INVENTION

The principal object of the present invention is to provide a method for extracting power from a DC motor using at least one of motor brushes as power extraction brush. In addition, the power extraction ability of the present invention offers efficient use of DC motor operations as it helps to dissipate heat created as a result of built-up BEMF during motor operations. In traditional DC motors at any specific time, the power brushes are connected only to two of the plurality of commutator segments of the motor. Yet, as the rotor rotates, the laminated iron cores and magnet coils are exposed to the stationary magnets, thus generating hidden potentials that further compound the BEMF phenomena that are occurring in the brushed DC motor.

According to the invention, a DC motor is operated using an input of specified voltage and amps through pulse width modulation (PWM). Power is extracted from the motor using variable controller which varies the frequency of the switches that allow extracted electrical power to get to the energy storage devices. The power is obtained through at least one power extracting brush into the energy storage devices. The extracted power can be used to do useful work or sent back to the power source through a cyclic transfer of power. The present invention is however, not limited to this option. In accordance with the present invention, a prime mover can be introduced to increase the power gain from the DC motor wherein the DC motor now works as a generator.

BRIEF DESCRIPTION OF THE DRAWING FIGURES

FIG. 5 is a back view of the present invention with the fan and base stand components, a bottom view being a mirror image thereof.

DETAILED DESCRIPTION

Figure 1:
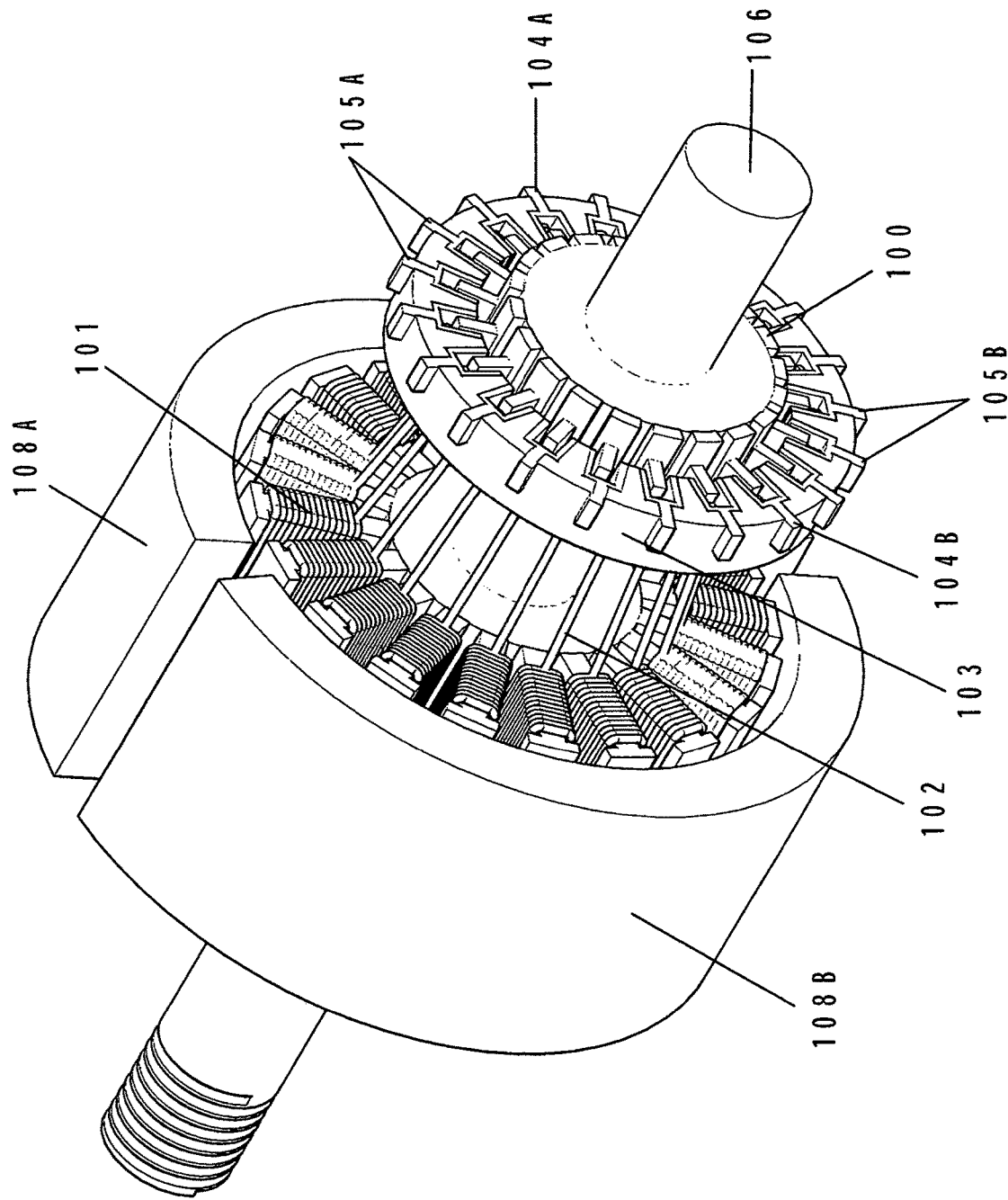
FIG. 1 is a general perspective view of the present invention, with a plurality of (n+1) brushes on the commutator segments where n is an integer equal to or greater than 2.

All illustrations are for the purpose of describing selected versions of the present invention and are not intended to limit the scope of the present invention. In reference to FIG. 1, there is shown the inner components of a DC motor. The components include a set of commutator segments 100 mounted on the rotor 106. The commutator is connected to the armature windings 101. The field magnet with north polarity 108A and south polarity 108B are arranged around the outside of the armature windings which are connected to the commutator segments by magnet wire 102. Furthermore, a brush holder housing 103 is integrated into the assembly as seen in FIG. 2, to hold and protect the plurality of the brushes from the elements; however the present invention is not limited to this option.

Figure 2:
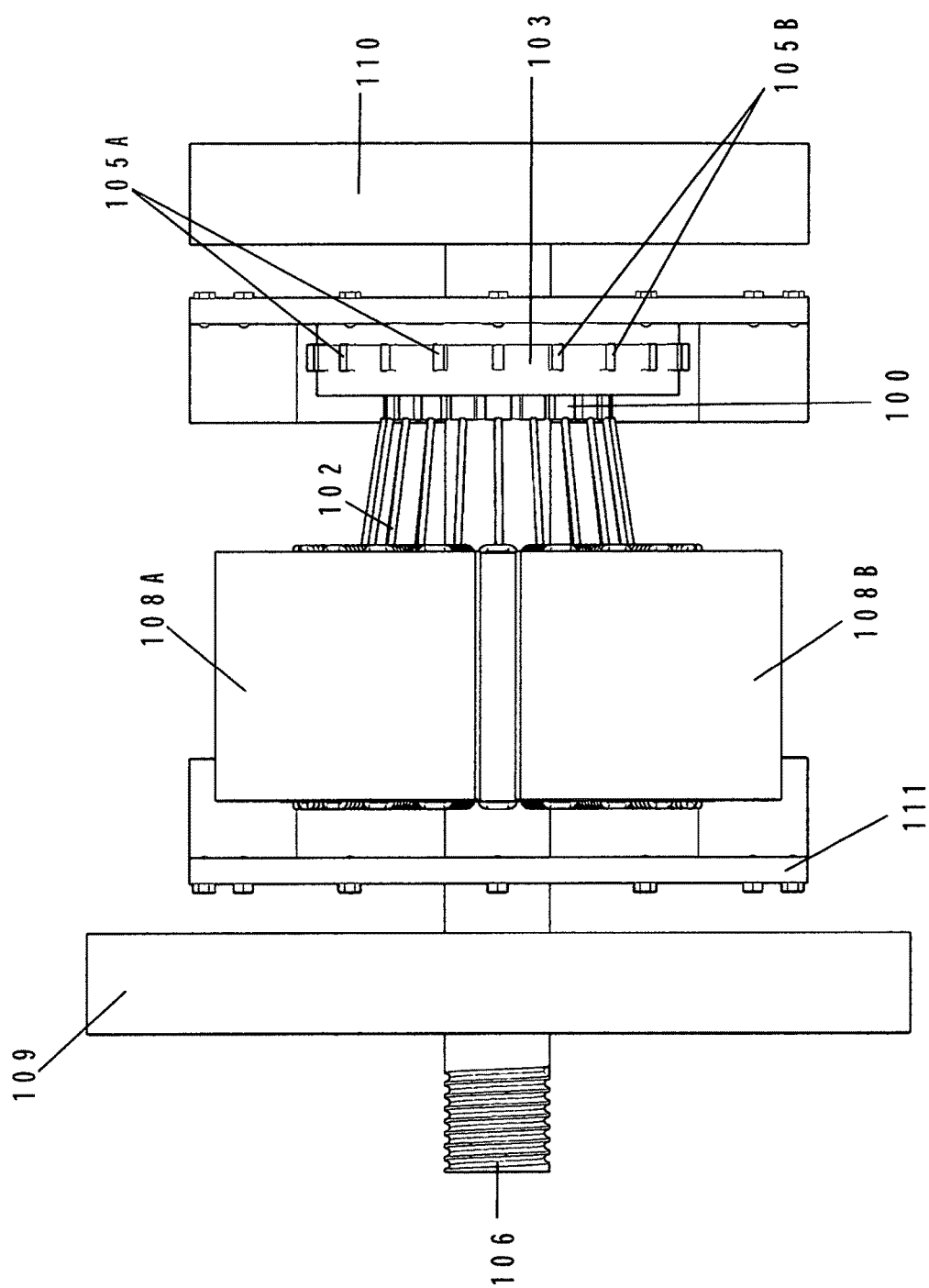
FIG. 2 is a side view of the present invention, with the flywheel, magnets and fan housing highlighted.

FIG. 2 is a side view of the embodiment of the DC motor. The flywheel 109 is mounted on the rotor 106 which is connected to the fan 110. The rotor 106 is the inner part which rotates during motor operation. At least one of the set of power extracting brushes 105A located on the side of the magnet with north polarity 108A can be connected to at least one of the set of power extracting brushes 105B located on the opposite side where the magnet is of south polarity 108B when extracting power from the system.

Figure 3:
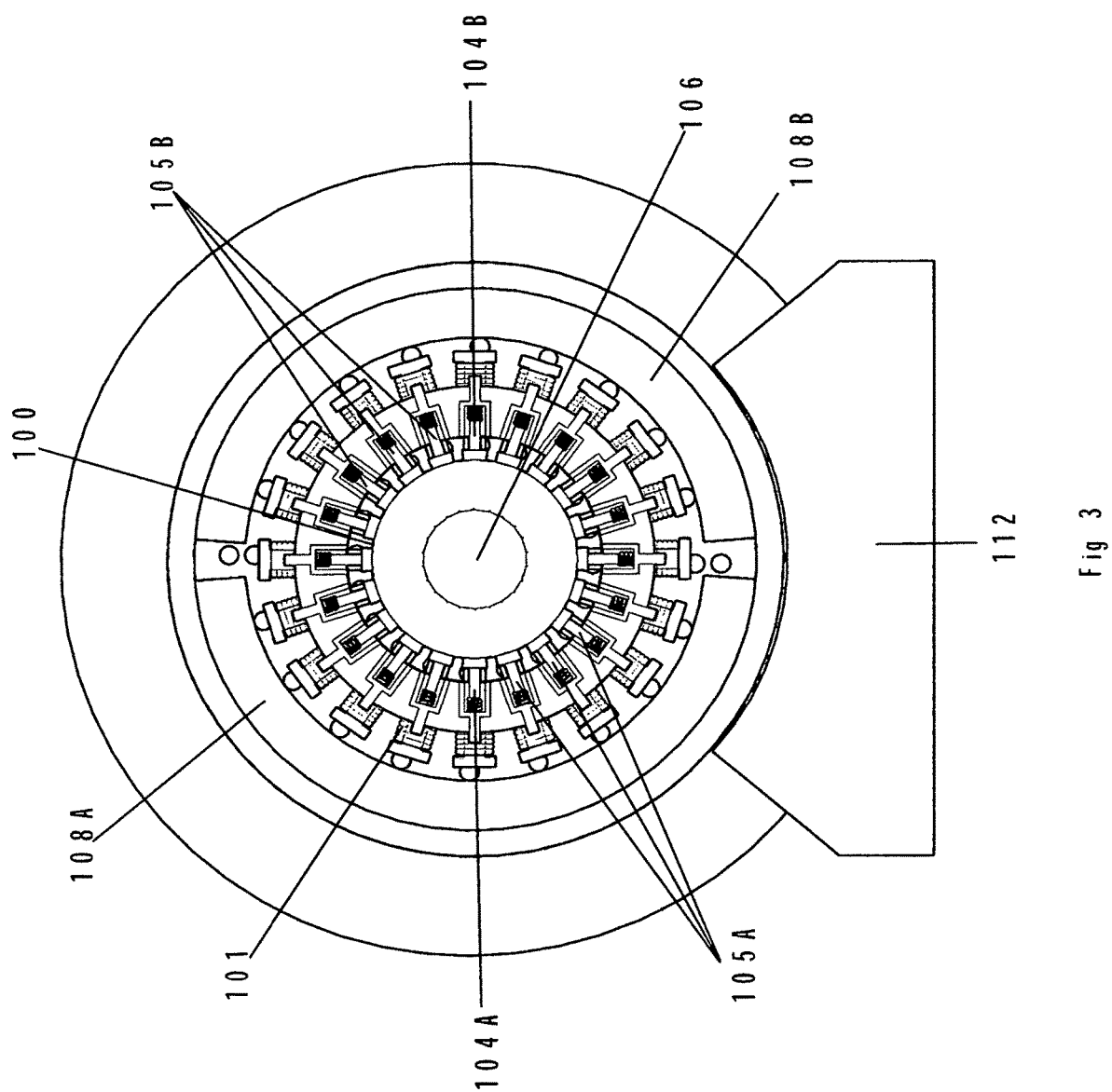
FIG. 3 is a front view of the present invention with a plurality of power brushes and extraction brushes arranged circumferentially on the commutator segments, a back view being a mirror image.

In the current embodiment the method of power generation relies on at least n+1 brushes where n is an integer equal to or greater than 2 with the brushes arranged circumferentially around the commutator 100 as seen in FIG. 3. The two power input brushes 104A and 104B are used to supply power to the motor to make the rotor 106 rotate. When power supplied to brushes 104A and 104B goes through a conductor lying perpendicular to the magnetic field generated by the magnets 108A and 108B, the interaction of current flowing in the conductor and the magnetic field will produce mechanical force that makes the motor to rotate such that the rotor starts to move in the direction of force. All of the several armature coils wound on the rotor experience this force, resulting in rotation through the magnetic field. At different commutator segment positions, the flux linked with the armature changes, which causes an EMF to be induced in them. This induced voltage is in opposition to the voltage coming into the motor through brushes 104A and 104B and which causes current to flow in the motor. This voltage is referred to as a counter-voltage or BEMF. If this voltage is not controlled, the motor may use more power and generate more heat in reaction to the said BEMF. Thus, the current invention uses a power extraction circuit to extract power from at least one of the power extracting brushes 105A or 105B and save the extracted electrical power in energy storage devices such as a capacitor 124. The body of the motor rests on the motor base stand 112.

Figure 4:
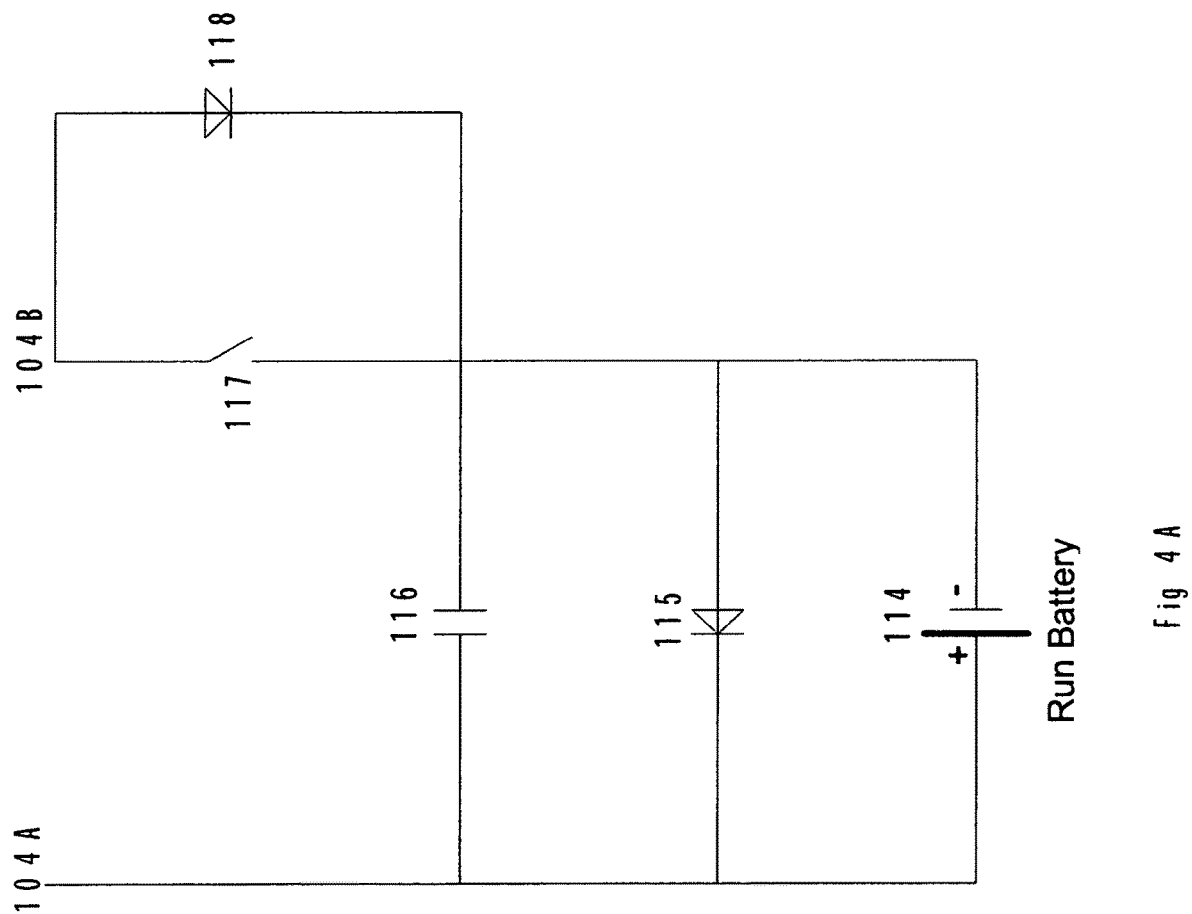
FIGS. 4A and 4B are simplified schematic diagrams of a preferred embodiment of power input and power extraction circuitries to control input and extracted power.

FIG. 4A is a simplified diagram of the power input circuitry into the motor through the input power brushes 104A and 104B. The source of power is a battery or battery bank 114 capable of supplying at least 24-48 volts and 4 amps to the motor through a PWM. A diode 115 and run capacitor 116 are connected in parallel to the input power. A power input switch 117 is connected to the negative side of the input power to provide a brief pulse from the PWM and when switch 11 opens, diode 118 is reverse biased and allows residual power to pass through to the energy storage capacitor 116 to shore up input power into the motor.

FIG. 4B is a simplified diagram of the power extraction circuitry from the motor through the power extraction brushes 105A and 105B. During motor operations, the generated BEMF extracted through 105A and 105B are used to charge energy storage capacitors 121 and 124 when the variable controller activates and closes switch 123. When the variable controller activates again and opens switch 123, it simultaneously closes switch 120 and thus allows extracted power to pass through to the energy storage device 119.

Figure 6:
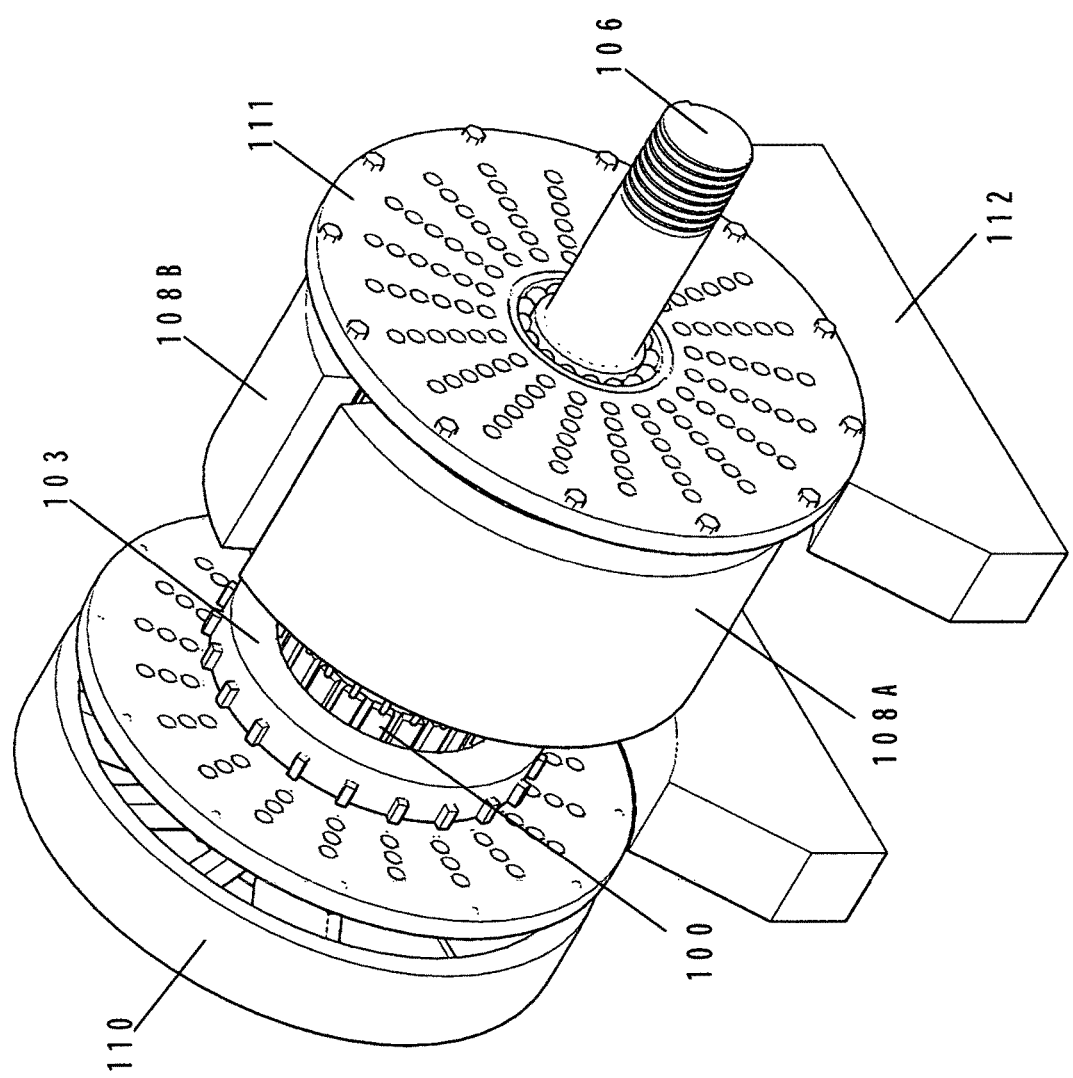
FIG. 6 is a side view of the present invention with the body flange, magnets and rotor components, a horizontal view being a mirror image thereof.
Figure 7:
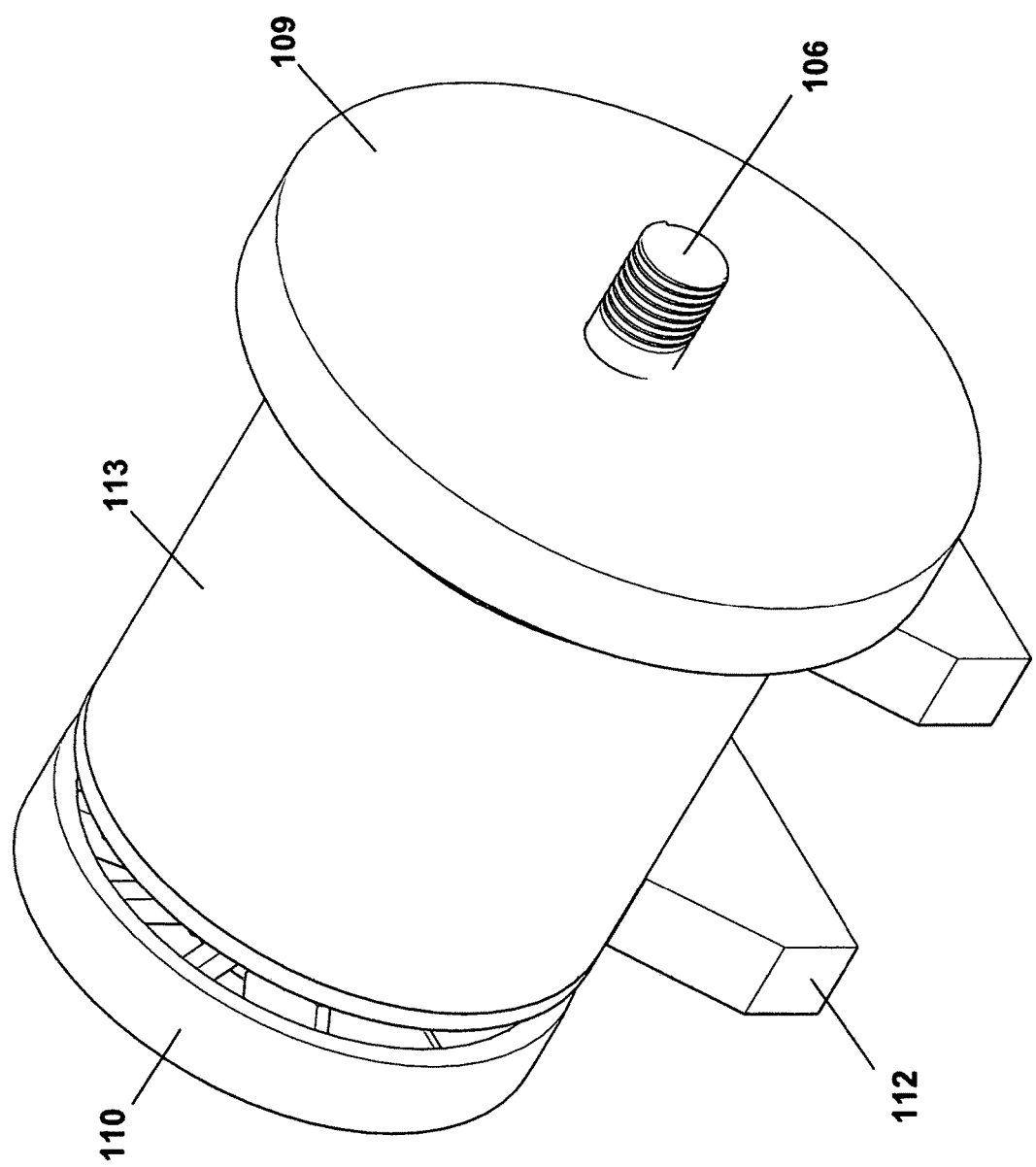
FIG. 7 is a perspective view of the present invention, with the housing for the DC motor, in accordance with an exemplary embodiment.

The back view is shown in FIG. 5. The fan blade 107 and flywheel 109 depicted in FIG. 5 rotate in unison while the fan works to cool the motor during operation. FIG. 6 depicts motor components on the motor base stand 112. FIG. 7 is a housing integrating the whole embodiment of the DC motor.

Another aspect of the present invention relates to recovering power directly from the same input source into the motor where brushes are connected between the power source and the motor. In this case, the motor is pulsed, and a diode (not shown) may be used in the output lines which can then be used to recharge the source battery.

In another embodiment, the electrical energy is recovered from the motor BEMF and only one of the brushes is passed to one pole of a battery while the second pole comes from the DC power source powering the brushed DC motor. Thus, the transfer of energy from the brushed DC motor is brought about by cyclically connecting output from the brushed DC motor with one pole of the source power for even more electrical power using the variable controlled device.

Furthermore, in another alternative implementation, the armature windings are halved, such that the magnetic field generated by the brushed DC motor comes from two set of commutator points. Thus, in one full cycle, the magnetic field which opposes the motor spinning the rotor is in one set of the armature windings while the second set is free of the BEMF. With this arrangement, there's an increasing power output from half of the brushes that then produce no noticeable effect on the turning of the rotor when used directly.

Generally, DC motors do not make good generators since they are designed for another purpose entirely, but they can nonetheless generate power. However, the present invention is able to leverage the presence of BEMF in brushed DC motors to increase the efficiency of the motor and integrate generator features into the same assembly.

Furthermore, in another embodiment a prime mover can be used to drive the modified brushed DC motor which is using the full potential of its windings to create optimal power via all the commutator segments of the motor.

Although the invention has been explained in relation to its preferred embodiment, it is to be understood that many other possible modifications and variations including modifying alternators used in automobiles can be made without departing from the spirit and scope of the invention.

What is claimed is:

1. A DC motor, comprising:
   a housing for containing:
   a rotor;
   a flywheel mounted on the rotor:
   a plurality of armature windings attached to a commutator mounted on the rotor;
   a pair of field magnets arranged on the outside of the armature windings to enclose the armature windings;
   two input power brushes arranged 180 degrees apart around the commutator to supply power to the motor;
   at least one power extraction brush arranged circumferentially around the commutator to extract power from the motor; and
   a power extraction circuit connected to the power extraction brush to extract power from the motor.

2. The DC motor of claim 1, further comprising a brush holder housing to arrange the input power brushes and the power extraction brush circumferentially around the commutator segments.

3. The DC motor of claim 1, further comprising a power source connected to the input power brushes.

4. The DC motor of claim 3, wherein the power source includes a pulse width modulator to supply power to the motor.

5. The DC motor of claim 4, wherein the pulse width modulator provides a variable output that may be adjusted by a user.

6. The DC motor of claim 1, wherein the power extraction circuit includes a variable controller and a first and a second switch wherein the variable controller controls the first and the second switches to direct power extracted from the motor between a capacitor and a battery.

7. The DC motor of claim 6, wherein the variable controller controls the frequency of the switches.

8. A method of using the DC motor recited in claim 6, comprising:
   connecting a power source to the input power brushes to cause the rotor to rotate;
   using the variable controller to connect the power extraction circuit to the motor by closing the first switch to charge the capacitor and using the variable controller to open the first switch and to close the second switch to allow the power from the capacitor to charge the battery.

9. The method of claim 8, wherein the power source provides a pulse width modulated signal.

10. The method of claim 9, further comprising using the variable controller to adjust the frequency of the switching of the switches to optimize the extraction of power.

* * * * *